July 15, 1969　　　　F. G. SOLTIS　　　　3,456,161
LOOK-AHEAD CONTROL CIRCUITRY
Filed Aug. 15, 1966　　　　　　　　　　　　　2 Sheets-Sheet 1

INVENTOR
FRANK G. SOLTIS

BY Donald F Voss
　　　ATTORNEY

July 15, 1969
F. G. SOLTIS
3,456,161
LOOK-AHEAD CONTROL CIRCUITRY
Filed Aug. 15, 1966
2 Sheets-Sheet 2
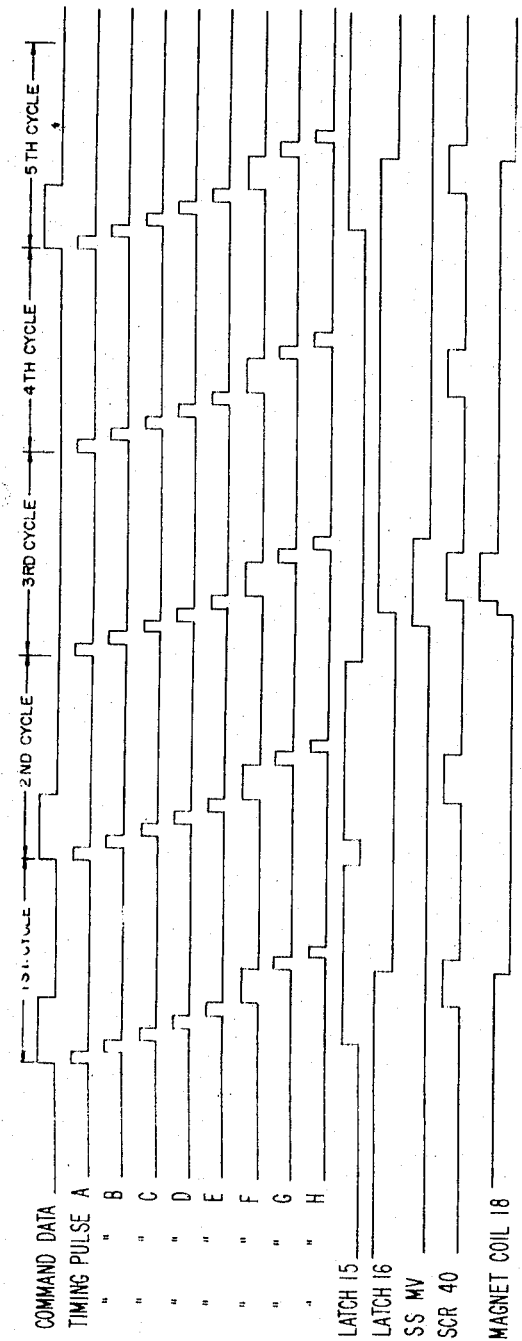
FIG.2
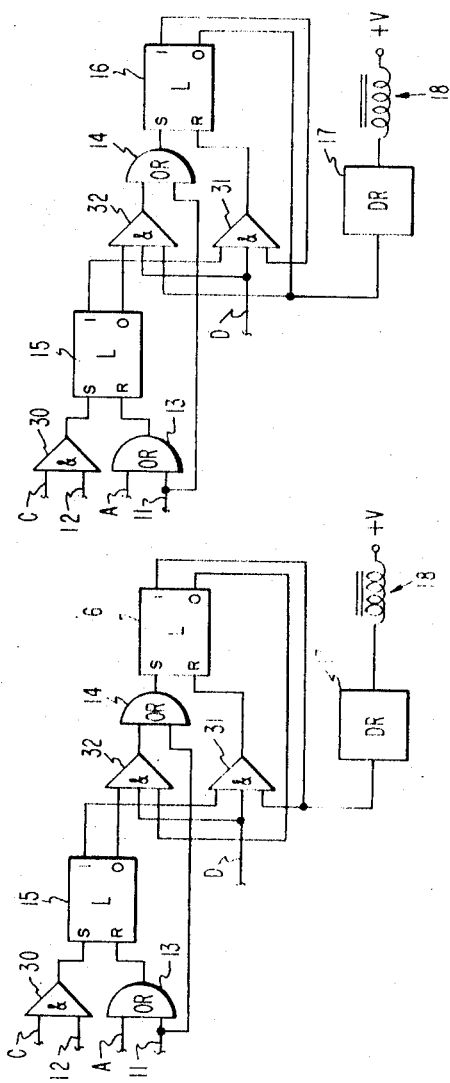
FIG.4
FIG.3

United States Patent Office 3,456,161
Patented July 15, 1969

3,456,161
LOOK-AHEAD CONTROL CIRCUITRY
Frank G. Soltis, Cannon Falls, Minn., assignor to International Business Machines Corporation, Armonk, N.Y., a corporation of New York
Filed Aug. 15, 1966, Ser. No. 572,304
Int. Cl. H01h 47/00, 47/32
U.S. Cl. 317—123        7 Claims

ABSTRACT OF THE DISCLOSURE

A control circuit for selectively operable cyclic machines, which stores present and next control commands and includes logic circuits for examining the stored commands, to determine the type of output control signal to be developed. Further, the next command storage is reset prior to receipt of a subsequent next command and where the circuit controls a magnetic coil, provision is made to provide an auxiliary energizing pulse to such magnetic coil, responsive to a predetermined period of time and combination of present and next commands.

---

This invention relates to control circuitry for a selectively operable cyclic machine such as a punch, printer, etc. and more particularly to control circuitry which considers the present and next control commands to determine the type of control signal to be developed.

Selectively operable cyclic machines such as punches, printers and the like usually use electromagnets for selection purposes. In some instances the magnet is required to be energized to effect the operation. In other arrangements, the magnet is de-energized for selection purposes. The invention is applicable in both instances.

Heretofore, it has been the practice to always perform a restore operation in each cycle. Therefore, during a cycle which requires an operation to take place, both the selection and restore functions have to be performed. However, when operating at very high speeds, it becomes quite difficult to perform both functions within the same cycle. Further, by looking ahead to determine what action is to take place during the next cycle, only one type of action need take place in any one cycle. For example, if it is necessary to energize a magnet to perform selection and if selections are to be made in two successive cycles, then the magnet can remain energized and not be de-energized between cycles. Likewise, if selection is performed by de-energizing the magnet, then it is unnecessary to energize the magnet between cycles if successive select operations are to take place. By this type of arrangement, the state of the magnet is switched only when a change is to take place. Thus, higher speeds of operation are possible.

Accordingly, a principle object of the invention is to provide improved control circuitry for selectively operable cyclic machines.

Another object of the invention is to provide improved control circuitry for selectively operable cyclic machines to enable higher speeds of operation.

Still another object of the invention is to provide control circuitry for selectively operable cyclic machines which consider both present and next commands to determine if a change in control is required.

A more specific object of the invention is to provide control circuitry for a selectively operable cyclic machine which provides a switching control signal only when a change in operation is to take place.

The foregoing and other objects, features and advantages of the invention will be apparent from the following more particular description of preferred embodiments of the invention, as illustrated in the accompanying drawings.

In the drawings:

FIG. 2 is a timing diagram for the circuitry of FIG. 1;

FIG. 3 is a schematic circuit diagram of a control circuit similar to that of FIG. 1, but without the circuit for providing an auxiliary energizing pulse for the magnet coil; and FIG. 4 is a schematic circuit diagram of a control circuit embodying the invention where a magnet coil is energized to perform a selection.

Figure 1A:
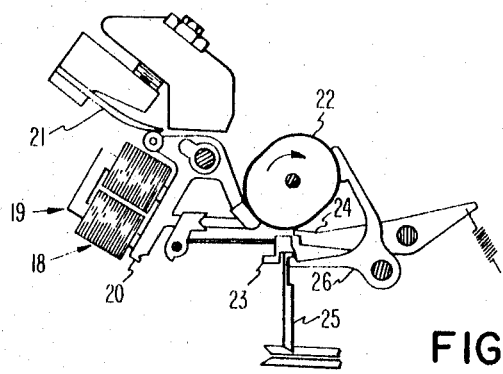
FIG. 1a shows a selectively operable punch controlled by the circuit of FIG. 1.
Figure 1:
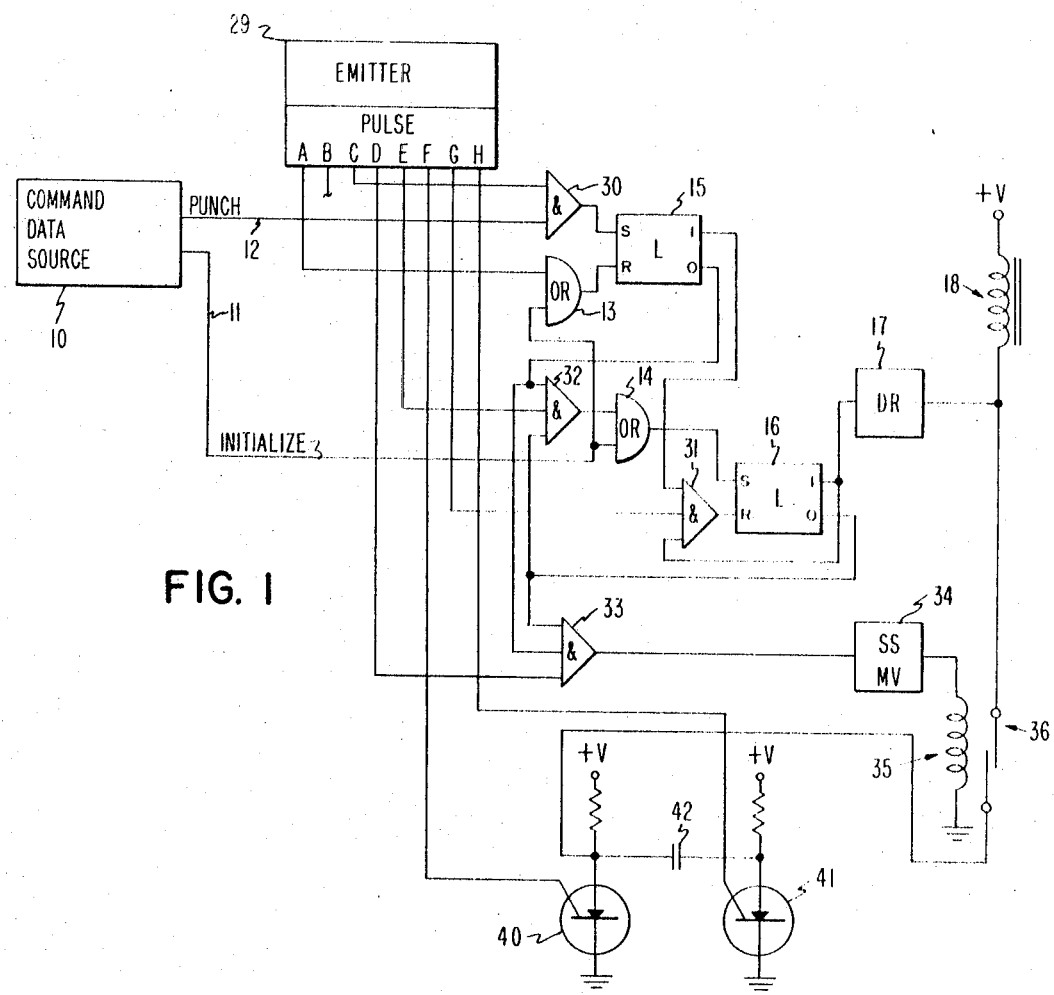
FIG. 1 is a schematic circuit diagram of a control circuit embodying the invention where the magnet coil is de-energized to perform a selection.

With reference to the drawings, and particularly to FIGS. 1 and 1a, the invention is illustrated by way of example as including a command data source 10 for providing an Initialize signal on line 11 and Punch signals on line 12. The command data source 10 can be any suitable control device such as a central processing unit of a computer. The Initialize signal provided by 10 is applied via OR circuits 13 and 14 to reset and set inputs of latches 15 and 16 respectively. Latch 16 controls the energization of magnet coil 18 via driver 17. It is seen that the Initialize pulse sets latch 16 and therefore coil 18 is initially energized.

Coil 18 is part of electromagnet 19 which is provided with an armature 20. Armature 20 is normally urged by spring 21 to follow cam 22. Cam 22 is continuously running and it returns armature 20 in close proximity to the pole pieces of magnet 19. By this arrangement, if it is desired to maintain the armature 20 against the pole pieces, it is only necessary to provide a holding current in coil 18. Thus, when it is desired to permit armature 20 to follow cam 22, coil 18 is de-energized. Magnet 19 is often referred to as a no-work magnet because it only holds the armature 20 against the pole pieces and the work necessary to return the armature against the pole pieces is done by cam 22.

Armature 20 carries or connects to an interposer 23 which must come between punch bail 24 and punch 25 in order to move punch 25 downwardly for a punching operation. Punch 25 is restored by restore lever 26. It is thus seen that interposer 23 can be moved to the right under action of spring 21 only when coil 18 is de-energized.

Latch 16 functions to store the present command and latch 15 stores the next command. In this particular example, it is seen in FIG. 2 that a punch command is issued by 10 during the first cycle. This command is passed by logical AND circuit 30 at C time to set latch 15. The C pulse is provided by emitter 29 which is driven in synchronism with cam 22. Emitter 29, connected to rotate in unison with cam 22, can be any suitable type of emitter and it generates the pulses A through H. The A pulse is applied to logical OR circuit 13 to reset latch 15 at the beginning of each cycle. The B pulse in this particular example is not used. The B pulse normally would be used for performing a check operation which does not form a part of the present invention.

With latch 15 set at C time, the input conditions to AND circuit 31 are satisfied and therefore, latch 16 is reset at G time. Because latch 16 is reset, driver 17 is switched off tnd coil 18 is de-energized. With coil 18 de-energized, armature 20 is pivoted by spring 21 and thus follows cam 22 whereby interposer 23 slides to the right under punch bail 24. Punching then takes place during the first part of the next or second cycle. At A time of the second cycle, latch 15 is reset. However, in this example, another punch command is provided from data source 10 and latch 15 is again set at C time. Since latch 15 is again set, latch 16 cannot be set because the input conditions to logical AND circuit 32 are not satisfied. Therefore, during this next cycle, latch 16 remains reset and coil 18 remains de-energized.

During the third cycle, latch 15 is again reset at A time. A no-punch command is issued for this cycle. The no-punch command is merely the absence of a punch command. Therefore, latch 15 does not become set at C time. Since both latches 15 and 16 are reset after A time, the input conditions to logical AND circuit 33 are satisfied at D time and it passes a signal for firing single-shot multivibrator 34. The output signal from singleshot multivibrator 34 energizes magnet coil 35. With magnet coil 35 energized, normally open contacts 36 are closed to provide a path for an auxiliary energizing pulse for coil 18. In some instances it may be desirable to provide a high energizing pulse at the time cam 22 returns armature 20 into close proximity of the pole pieces of magnet 19.

The auxiliary energizing pulse, in this example, is generated each cycle. The F pulse is applied to the gate of silicon controlled rectifier 40 to turn it on. When 40 turns on, normally conducting silicon controlled rectifier 41 turns off because its anode potential is lowered via coupling capacitor 42. The energizing output signal is taken from the anode of 40 and applied to coil 18 via the now closed contacts 36. At H time, 41 is switched on and 40 switches off because its anode potential is lowered via the coupling capacitor 42. It should be noted that the duration of singleshot multivibrator 34 extends beyond H time and thus contacts 36 are closed during the entire time that the auxiliary energizing pulse is available. Further, because of the ability to selectively apply the auxiliary energizing pulse to coil 18, via contacts 36, it is possible to use only a single pair of silicon controlled rectifiers for several punch positions.

After coil 35 is de-energized, and contacts 36 return to their normally open position, coil 18 still remains energized but with a lower holding current. Latch 15 remains reset because the next command is a no-punch command; however, since latch 16 is set, the auxiliary energizing pulse will not be passed. This is because the input conditions to logical AND circuit 33 are not satisfied; therefore, singleshot multivibrator 34 is not fired to energize coil 35. It would be undesirable to apply the auxiliary energizing pulse in this instance because it would unnecessarily generate heat in coil 18.

In some instances it may be unnecessary to provide the auxiliary energizing pulse. If this be the case, the circuit can take the form as shown in FIG. 3. Further, in FIG. 3, it is seen that the same pulse can be used for conditioning AND circuits 31 and 32.

The circuit arrangement in FIG. 4 is the same as in FIG. 3 except that coil 18 must be energized when a punching operation is to take place. Thus, the reset output of latch 16 is connected to coil driver 17.

The invention, of course, is not limited to a selectively operable punching machine. The control circuitry of the invention could be utilized for controlling printing operations, card selection into stackers, card feeding and other like operations where a magnet is used for selecting purposes.

While the invention has been particularly shown and described with reference to preferred embodiments thereof, it will be understood by those skilled in the art that the foregoing and other changes in form and details may be made therein without departing from the spirit and scope of the invention.

What is claimed is:
1. Control circuitry for operating the magnet coil comprising:
   data storage means for storing present and next magnet operation command indications, and
   logic means for examining said command indications to cause development of energizing and de-energizing signals for said magnet when said next command indication differs from said present command indication.
2. The control circuitry of claim 1 further comprising:
   magnet driving means connected to said logic means and responsive to said energizing signal to provide a controlled energy signal for energizing said magnet.
3. The control circuitry of claim 1 wherein said logic means causes development of energizing and de-energizing signals at the output of said storage means.
4. The control circuitry of claim 1 wherein at least the portion of said data storage means for storing said next command indication is reset prior to a subsequent next command being entered therein.
5. The control circuit of claim 1 further comprising:
   means responsive at a predetermined period of time to a predetermined set of present and next command indications to provide an auxiliary energizing pulse.
6. The controrl circuit of claim 5 where said predetermined set of commands are a de-energize present command and an energize next command.
7. Control circuitry for operating a magnet coil comprising:
   means for cyclically generating a plurality of sequentially occurring timing pulses;
   first data storage means having set and reset inputs and outputs for storing next magnet operation command indications;
   first logic means connected to said set input of said first storage means and responsive to a first timing signal and a data signal for setting said first storage means;
   second data storage means having set and reset inputs and outputs for storing present magnet operation command indications, the set output thereof when active provides a magnet energizing signal;
   second logic means having inputs connected to receive a second timing pulse and connected to the reset output of said first storage means and having an output connected to the set input of said second data storage means, and
   third logic means having inputs connected to receive said second timing pulse and connected to the set output of said first storage means and having an output connected to the reset input of said second storage means whereby if said first storage means is in the reset state at the occurrence of said second timing pulse, said second data storage means is reset.

References Cited

UNITED STATES PATENTS 2,896,130    7/1959    Tompkins _____ 317—148.5
3,136,481    6/1964    Handley _____ 234—128

JOHN F. COUCH, Primary Examiner
W. H. BEHA, JR., Primary Examiner

U.S. Cl. X.R.

101—93; 317—148.5